(12) United States Patent
Dawson et al.

(10) Patent No.: US 7,860,081 B2
(45) Date of Patent: Dec. 28, 2010

(54) OPTIMIZATION PROCESS AND SYSTEM FOR MULTIPLEXED GATEWAY ARCHITECTURE

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 11/755,763

(22) Filed: May 31, 2007

(65) Prior Publication Data

US 2008/0300931 A1  Dec. 4, 2008

(51) Int. Cl.
*H04L 12/26* (2006.01)
*G06Q 40/00* (2006.01)

(52) U.S. Cl. .............. 370/352; 370/465; 370/469; 370/389; 705/35

(58) Field of Classification Search ............. 705/35–39; 455/405–406, 456.1–456.6
See application file for complete search history.

(56) References Cited

U.S. PATENT DOCUMENTS

| | | | |
|---|---|---|---|
| 5,437,054 A | 7/1995 | Rappaport et al. |
| 5,490,201 A | 2/1996 | Moberg et al. |
| 6,006,084 A | 12/1999 | Miller et al. |
| 6,035,281 A | 3/2000 | Crosskey et al. |
| 6,047,268 A | 4/2000 | Bartoli et al. |
| 6,366,907 B1 | 4/2002 | Fanning et al. |
| 6,396,805 B2 | 5/2002 | Romrell |
| 6,397,061 B1 | 5/2002 | Jordan et al. |
| 6,522,735 B1 | 2/2003 | Fortman et al. |
| 6,653,933 B2 | 11/2003 | Raschke et al. |
| 6,751,196 B1 | 6/2004 | Hulyalkar et al. |
| 6,763,248 B1 | 7/2004 | Odamura |
| 6,810,428 B1 | 10/2004 | Larsen et al. |
| 6,850,764 B1 | 2/2005 | Patel |
| 6,941,378 B2 | 9/2005 | Apostolopoulos et al. |
| 6,954,616 B2 | 10/2005 | Liang et al. |

(Continued)

FOREIGN PATENT DOCUMENTS

EP    0999662    5/2005

(Continued)

OTHER PUBLICATIONS

Non-final Office Action dated Nov. 25, 2009 in U.S. Appl. No. 11/755,780.

(Continued)

*Primary Examiner*—James P Trammell
*Assistant Examiner*—Elda Milef
(74) *Attorney, Agent, or Firm*—William Schiesser; Roberts Mlotkowski Safran & Cole, P.C.

(57) ABSTRACT

Process and system for optimizing one of uploading and downloading of at least one file through at least one lender in multiplexed gateway architecture. The process includes identifying available lenders coupled to a multiplexed gateway within a vicinity of a borrower, selecting an optimization criterion, and selecting a number of the identified available lenders based upon the selected optimization criterion. The method also includes dividing at least one file to be one of uploaded and downloaded into parts corresponding to the number of selected lenders, and assigning a part of the at least one file to each selected lender.

45 Claims, 8 Drawing Sheets

U.S. PATENT DOCUMENTS

| | | |
|---|---|---|
| 6,954,790 B2 | 10/2005 | Forslöw |
| 6,961,575 B2 | 11/2005 | Stanforth |
| 6,975,613 B1 | 12/2005 | Johansson |
| 6,980,511 B1 | 12/2005 | Li |
| 6,990,113 B1 | 1/2006 | Wang et al. |
| 7,016,375 B1 | 3/2006 | Rosenberg et al. |
| 7,028,096 B1 | 4/2006 | Lee |
| 7,043,225 B1 * | 5/2006 | Patel et al. .................. 455/405 |
| 7,058,014 B2 | 6/2006 | Sim |
| 7,058,387 B2 | 6/2006 | Kumar et al. |
| 7,065,367 B2 | 6/2006 | Michaelis et al. |
| 7,075,890 B2 | 7/2006 | Ozer et al. |
| 7,089,301 B1 | 8/2006 | Labio et al. |
| 7,130,283 B2 * | 10/2006 | Vogel et al. ................. 370/322 |
| 7,174,385 B2 | 2/2007 | Li |
| 7,224,964 B2 | 5/2007 | Souissi et al. |
| 7,240,015 B1 | 7/2007 | Karmouch et al. |
| 7,257,632 B2 | 8/2007 | Zhang et al. |
| 7,274,658 B2 | 9/2007 | Bornstein et al. |
| 7,310,641 B2 * | 12/2007 | Moore et al. ....................... 1/1 |
| 7,340,759 B1 * | 3/2008 | Rodriguez .................... 725/8 |
| 7,376,747 B2 | 5/2008 | Hartop |
| 7,401,153 B2 | 7/2008 | Traversat et al. |
| 7,440,573 B2 | 10/2008 | Lor et al. |
| 7,447,656 B2 | 11/2008 | Parthasarathy |
| 7,450,517 B2 | 11/2008 | Cho |
| 7,450,949 B2 | 11/2008 | Choksi |
| 7,460,549 B1 | 12/2008 | Cardei et al. |
| 7,463,890 B2 | 12/2008 | Herz |
| 7,489,656 B2 | 2/2009 | Guo et al. |
| 7,546,342 B2 | 6/2009 | Li et al. |
| 7,593,333 B2 | 9/2009 | Li et al. |
| 2001/0029182 A1 | 10/2001 | McCann et al. |
| 2002/0053033 A1 | 5/2002 | Cooper et al. |
| 2002/0053082 A1 | 5/2002 | Weaver et al. |
| 2002/0058499 A1 | 5/2002 | Ortiz |
| 2002/0069278 A1 | 6/2002 | Forslöw |
| 2002/0102987 A1 | 8/2002 | Souisse et al. |
| 2002/0110110 A1 | 8/2002 | Tiihonen et al. |
| 2002/0120873 A1 | 8/2002 | Salmivalli |
| 2002/0122410 A1 | 9/2002 | Kulikov et al. |
| 2002/0141358 A1 | 10/2002 | Requena |
| 2002/0145978 A1 | 10/2002 | Batsell et al. |
| 2003/0068975 A1 | 4/2003 | Qiao et al. |
| 2003/0117978 A1 | 6/2003 | Haddad |
| 2003/0120594 A1 | 6/2003 | Shaginaw et al. |
| 2003/0137976 A1 | 7/2003 | Zhu et al. |
| 2003/0139180 A1 | 7/2003 | McIntosh et al. |
| 2003/0153338 A1 | 8/2003 | Herz et al. |
| 2003/0235174 A1 | 12/2003 | Pichna et al. |
| 2004/0006621 A1 | 1/2004 | Bellinson et al. |
| 2004/0029553 A1 | 2/2004 | Cain |
| 2004/0064351 A1 | 4/2004 | Mikurak |
| 2004/0128231 A1 * | 7/2004 | Morita ........................ 705/38 |
| 2004/0156312 A1 | 8/2004 | Salonidis et al. |
| 2004/0162871 A1 | 8/2004 | Pabla et al. |
| 2004/0165548 A1 | 8/2004 | Backes |
| 2004/0185777 A1 | 9/2004 | Bryson |
| 2004/0192204 A1 | 9/2004 | Periyalwar et al. |
| 2004/0260808 A1 | 12/2004 | Strutt |
| 2004/0264466 A1 | 12/2004 | Huang |
| 2005/0080872 A1 | 4/2005 | Davis et al. |
| 2005/0153725 A1 | 7/2005 | Naghian et al. |
| 2005/0157661 A1 | 7/2005 | Cho |
| 2005/0169209 A1 | 8/2005 | Miu et al. |
| 2005/0169257 A1 | 8/2005 | Lahetkangas et al. |
| 2005/0193221 A1 | 9/2005 | Yoneyama |
| 2005/0203834 A1 | 9/2005 | Prieston |
| 2005/0213503 A1 | 9/2005 | Guo et al. |
| 2006/0002326 A1 | 1/2006 | Vesuna |
| 2006/0085543 A1 | 4/2006 | Hrastar et al. |
| 2006/0095582 A1 | 5/2006 | Nitya et al. |
| 2006/0114853 A1 | 6/2006 | Hasty et al. |
| 2006/0126504 A1 | 6/2006 | Meier et al. |
| 2006/0167784 A1 | 7/2006 | Hoffberg |
| 2006/0176829 A1 | 8/2006 | McLaughlin et al. |
| 2006/0179143 A1 | 8/2006 | Walker et al. |
| 2006/0187858 A1 | 8/2006 | Kenichi et al. |
| 2006/0193295 A1 | 8/2006 | White et al. |
| 2006/0224502 A1 | 10/2006 | McGowan |
| 2007/0005797 A1 | 1/2007 | Fontijn et al. |
| 2007/0117537 A1 | 5/2007 | Hui et al. |
| 2008/0008140 A1 | 1/2008 | Forssell |
| 2008/0040481 A1 | 2/2008 | Joshi et al. |
| 2008/0167982 A1 | 7/2008 | Leo et al. |

FOREIGN PATENT DOCUMENTS

| | | |
|---|---|---|
| WO | 9915960 | 4/1999 |
| WO | 03 037009 | 5/2003 |
| WO | 04 001585 | 12/2003 |
| WO | 2006 004628 | 1/2006 |

OTHER PUBLICATIONS

Non-final Office Action dated Nov. 25, 2009 in U.S. Appl. No. 11/755,802.

D. Zhu et al., "QoS Aware Wireless Bandwidth Aggregation (QAWBA) by Integrating Cellular and Ad-hoc Networks."

D. Zhu et al., "Using Cooperative Multiple Paths to Reduce File Download Latency in Cellular Data Networks."

Non-final Office Action dated Dec. 23, 2008 in U.S. Appl. No. 11/755,806.

Final Office Action dated Jun. 3, 2009 in U.S. Appl. No. 11/755,806.

Final Office Action dated Jun. 9, 2009 in U.S. Appl. No. 11/755,806.

Non-final Office Action dated Oct. 19, 2009 in U.S. Appl. No. 11/755,788.

Qui et al.. "Bandwidth in Ad Hoc Networks: A Price-Based Approach," 2003, IEEE, pp. 1-10.

Non-final Office Action dated Dec. 24, 2009 in U.S. Appl. No. 11/755,776.

Non-final Office Action dated Jan. 22, 2010 in U.S. Appl. No. 11/755,778.

Non-final Office Action dated Jan. 21, 2010 in U.S. Appl. No. 11/755,808.

Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.

Non-Final Office Action dated Mar. 4, 2010 in U.S. Appl. No. 11/755,775.

Final Office Action dated Mar. 5, 2010 in U.S. Appl. No. 11/755,788.

Non-Final Office Action dated Mar. 22, 2010 in U.S. Appl. No. 11/755,782.

Non-Final Office Action dated Jan. 25, 2010 in U.S. Appl. No. 11/755,771.

Office Action dated Jun. 4, 2010 in U.S. Appl. No. 11/755,780.

Office Action dated Jun. 22, 2010 in U.S. Appl. No. 11/755,776.

Office Action dated Jul. 12, 2010 in U.S. Appl. No. 11/755,808.

Notice of Allowance dated Jun. 9, 2010 in U.S. Appl. No. 11/755,802.

Notice of Allowance dated Jun. 28, 2010 in U.S. Appl. No. 11/755,771.

Notice of Allowance dated Jul. 13, 2010 in U.S. Appl. No. 11/755,778.

Notice of Allowance dated Aug. 25, 2010 in U.S. Appl. No. 11/755,780.

Office Action dated Sep. 14, 2010 in U.S. Appl. No. 11/755,788.

Final Office Action dated Sep. 15, 2010 in U.S. Appl. No. 11/755,782.

Notice of Allowance dated Oct. 12, 2010 in U.S. Appl. No. 11/755,808.

Office Action dated Oct. 29, 2010 in U.S. Appl. No. 11/755,786.
IEEE 802.22, Wireless RANs, 220 pages, Mar. 2006.
Michelini et al, Spectral Sharing Across 2G-3G Systems, IEEE, 5 pages, 2003.

Das et al, A Structured Channel Borrowing Scheme for Dynamic Load Balancing in Cellular Networks, IEEE, 8 pages, 1997.

* cited by examiner

| Node Name | Node Type | Location | File Requested for Transfer | Price | Service Level Objective | Current Quality of Service |
|---|---|---|---|---|---|---|
|  |  |  |  |  |  |  |
|  |  |  |  |  |  |  |

Fig. 3

OPTIMIZATION PROCESS AND SYSTEM FOR MULTIPLEXED GATEWAY ARCHITECTURE

CROSS-REFERENCE TO RELATED APPLICATIONS

This application is related to the following copending applications, all of which are incorporated herein by reference in their entireties: Copending application Ser. No. 11/755,808; copending application Ser. No. 11/755,780 and copending application Ser. No. 11/755,775.

FIELD OF THE INVENTION

The invention generally relates to systems and processes for optimizing a borrower's selection of lender bandwidth in an ad hoc network and, more particularly, to systems and processes for optimizing a borrower's selection of lender bandwidth in a multiplexed gateway bandwidth sharing architecture for mobile ad hoc networks according to various optimization objectives.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBeee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-á-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method includes identifying available lenders coupled to a multiplexed gateway within a vicinity of a borrower, selecting an optimization criterion, and selecting a number of the identified available lenders based upon the selected optimization criterion. The method also includes dividing at least one file to be one of uploaded and downloaded into parts corresponding to the number of selected lenders, and assigning a part of the at least one file to each selected lender.

In another aspect of the invention, a system is provided for optimizing selection of bandwidth in a multiplexed gateway architecture. The system includes a device which identifies available bandwidth lenders coupled to a multiplexed gateway within a vicinity of a requester, a selector unit to select at least one requester optimization criterion, and an input unit to receive input from one of the requester and the multiplexed gate way regarding a selected number of the available bandwidth lenders based upon the selected at least one requester optimization criterion. The system also includes a divider structured and arranged to divide a task into a number of discrete pieces that correspond to the number of selected lenders, and an assignor unit to assign each discrete piece of the task to different selected lenders.

In another aspect of the invention, the system includes a server having a database containing data associated with one or more instructions for implementing a multiplexed gateway ad-hoc network, and at least one of a hardware and software component for optimizing selection of lenders of bandwidth and allocation of one of files and pieces of files to the selected lenders of bandwidth and for establishing the multiplexed gateway ad-hoc network between a borrower and the selected lenders of bandwidth.

In another aspect of the invention, a method is provided for optimizing selection of bandwidth in a multiplexed gateway architecture. The method includes a computer infrastructure operable to receive an optimization criterion from a requester of bandwidth, receive a number corresponding to a number of available lenders of bandwidth to be selected for completing a task, divide the task into a number discrete pieces, and assign, via the multiplexed gateway, each piece of the divided task to a different selected lender of bandwidth.

In another aspect of the invention, a computer program product comprises a computer usable medium having readable program code embodied in the medium and includes at least one component to identify available bandwidth lenders coupled to a multiplexed gateway within a vicinity of a requester, receive an optimization criterion from the requester, receive a number of lenders coupled to the multiplexed gateway to be selected, divide, via the multiplexed gateway, a task into discrete pieces that correspond in number to the number of selected lenders, and assign each discrete piece to a different selected lender.

BRIEF DESCRIPTION OF THE DRAWINGS

FIG. 3 is an overview for initiating a multiplexed ad hoc network;

DETAILED DESCRIPTION OF EMBODIMENTS OF THE INVENTION

The present invention is directed to processes and systems for optimizing a borrower's lender selection in a multiplexed gateway bandwidth sharing architecture for mobile ad hoc networks according to various optimization objectives. The optimization can be based on time, cost, bandwidth or other optimization considerations. In general, the borrower decides on the optimization objective or technique. In embodiments, either the borrower alone or with the assistance of the service provider, e.g., a multiplexer, or the multiplexer alone can decide on the number of lenders to select, which can be a selection of the lenders themselves. The multiplexer can decide how to divide the borrower's task, e.g., one or more large files for uploading or downloading, and to assign the divided portions of the files to the selected lenders.

As the above-noted decisions are not easily made within a short period of time, the borrower can predefine preferences in order to select the desired optimization technique and, preferably a maximum number of the available lenders to consider for selection. These predefined preferences can be stored in user's device, e.g., notebook, PDA, smart phone, etc., or can be stored in a remote location maintained by a service provider, e.g., a centralized database for storing information regarding borrowers and lenders.

In a multiplexed gateway bandwidth sharing architecture for ad hoc networks, a borrower can be connected to multiple lenders through a multiplexed gateway device, e.g., a multiplexer of a service provider. The multiplexer can act as a gateway to access the Internet or a specific server on a private network, such that the bandwidth available between the lenders and such network or server is dictated by the bandwidth offered by the multiplexer. The bandwidth between the multiplexer and the borrower may be an aggregate of the bandwidth of each lender, with an assumption that this aggregated bandwidth cannot exceed the bandwidth of the multiplexer, since all data is routed through the multiplexer.

Thus, according to the invention, depending on the demand and supply situation for lenders, a borrower can optimize the situation to his/her advantage. By using a scheme for borrowing bandwidth within an ad hoc network, multiple disparate wireless connections to the multiplexer can be used to aggregate bandwidth for transmission of data over a network. The individuals who share their current connections, e.g., bandwidth, acting as gateway devices, are lenders of bandwidth; whereas, the individuals who require additional bandwidth are borrowers. In this way, a borrower in need of bandwidth may borrow bandwidth from lenders in an ad Dhoc network, utilizing the lender's bandwidth (e.g., cellular connection to the Internet, hotspot connection, etc.) in the manner best suited to the borrower's task.

System Environment

Figure 1:
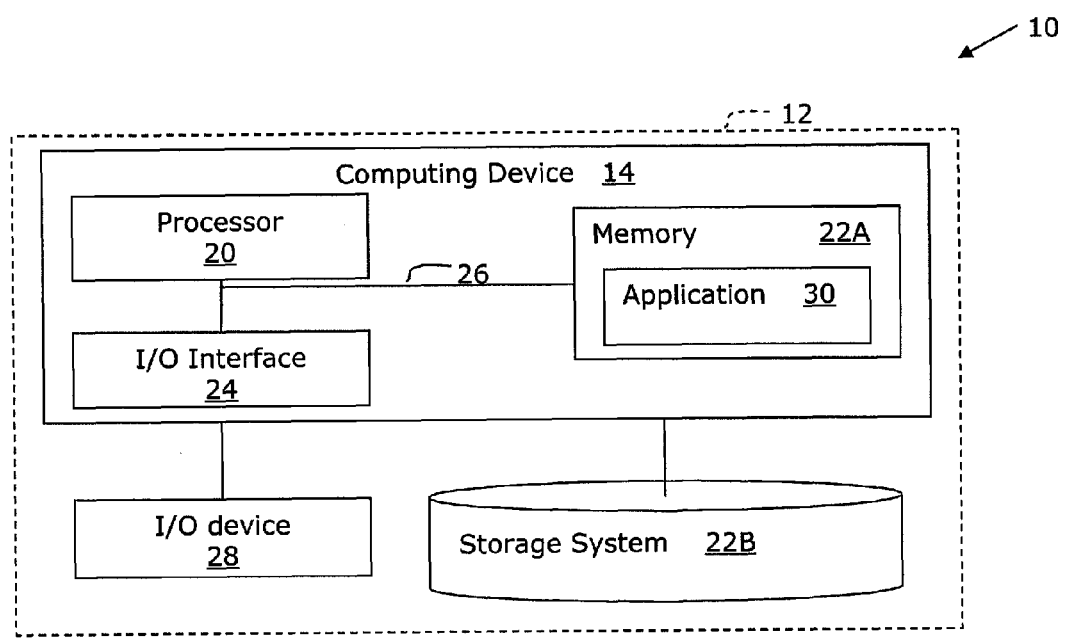
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to permit compensation schemes between borrowers, or their service providers, and lenders, or their service providers, for borrowed bandwidth within an ad hoc network, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is a 802.11g local area connection that creates a high-speed wireless connection between two cellular phone devices within close range (high bandwidth), and wherein the cellular phones' cellular connection may provide bandwidth at less than $\frac{1}{100}^{th}$ of the 802.11 connection.

The present invention is directed to systems and methods by which a borrower of bandwidth in an ad hoc network selects lenders of bandwidth in an effort to optimize the cost of services, time of upload/download, etc. The specific pricing mechanisms which can be implemented with the invention are disclosed in the following applications, all which are hereby incorporated by reference in their entirety. For example, the negotiation and acceptance of agreed pricing, and the formation and rearrangement of the bandwidth sharing ad hoc networks is set forth in co-pending application Ser. No. 11/755,775. The negotiation and acceptance of agreed pricing, and the formation and rearrangement of lending devices that perform multiplexing functions is set forth in co-pending application Ser. No. 11/755,779. Price offerings are set forth in co-pending application Ser. No. 11/755,782. Market price offerings are set forth in co-pending application Ser. No. 11/755,800.

To access a wireless network, a user needs an access point connection, e.g., a wireless router, hot spot, wireless connection port. However, when a user is not in the vicinity of such an access point connection, various devices, e.g., cell phones, can be used to provide a connection to a wireless network, but the bandwidth may be limited, i.e., not sufficient to enable fast exchanges, e.g., uploads, downloads, etc. Thus, through the ad hoc network the user or borrower can use unused bandwidth of others or lenders to partition tasks and speed up transmission, thereby reducing wait time.

In general, the invention comprises optimizing the selection of lenders based upon their different payment schemes and/or bandwidth speeds, as well as their available bandwidth. For example, in embodiments of the invention, a borrower of bandwidth may select a maximum number of lenders to consider, select a number of lenders to use, and/or select the lenders so as to optimize the completion of the task according to the optimization technique. In other embodiments, a borrower of bandwidth may instruct the multiplexed gateway to assist the borrower in the selection of the number of lenders and/or the selection of lenders in order to optimize completion of the task in accordance with the selected optimization technique. In other embodiments, a borrower of bandwidth may instruct the multiplexed gateway to select lenders so as to minimize the time for completing the task. In other embodiments, a borrower may instruct the multiplexed gateway to select lenders so as to maximize the throughput of data to complete the task. In other embodiments, a borrower may instruct the multiplexed gateway to select lenders in order to reduce the risk of drop-offs during the task. In another embodiment, a borrower may instruct the multiplexed gateway to select lenders based upon the lenders history of reliability. In other embodiments, a borrower may instruct the multiplexed gateway to select lenders in an effort to maximize lender capabilities.

General Overview of Ad Hoc Networks

In order to utilize compensation mechanisms for sharing bandwidth, an ad hoc network may be created between a borrower node and one or more lender nodes, and a compensation scheme for the shared bandwidth may be established. This process may include both an initial discovery mechanism of the proposed role each node may play, and a negotiation and acceptance of the agreed compensation scheme.

Figure 2:
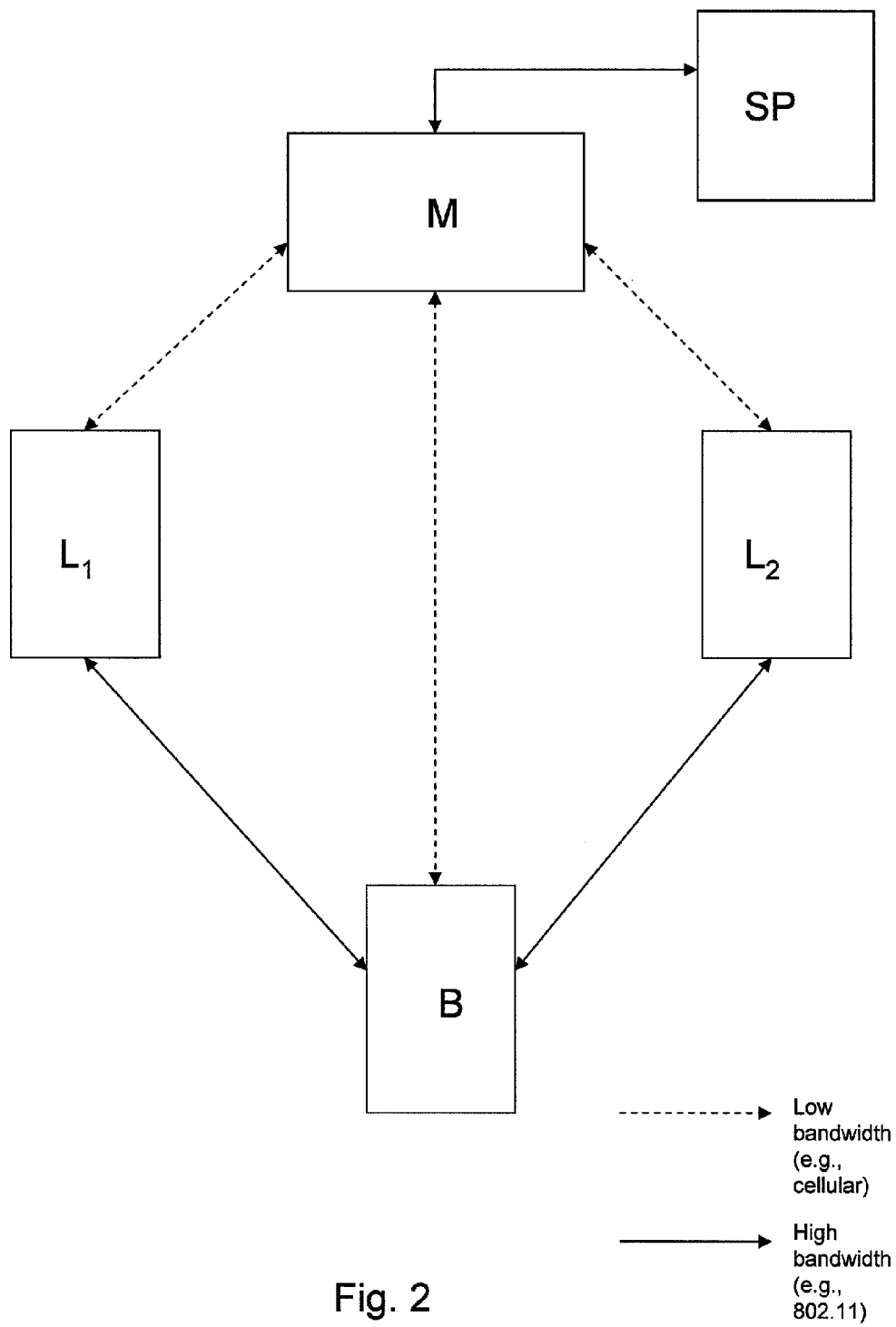
FIG. 2 is an overview of a multiplexed gateway bandwidth bandwidth-sharing ad hoc network.

FIG. 2 is a general overview of a multiplexed gateway bandwidth sharing architecture which may be implemented with the invention. An illustrative multiplexed gateway bandwidth sharing architecture is set forth in co-pending application Ser. No. 11/755,780. In this implementation, a borrower B will request a multiplexer M to set up an ad-hoc network. The multiplexer M may communicate with a service provider SP and connect to one or more lenders, $L_1$ and $L_2$, via a wireless network. Once a network is established, the multiplexer will manage the network, including the bandwidth allocations provided by each of the lenders, for example.

Initial Formation of the Ad Hoc Network

In a selected gateway environment, in order to form a new ad hoc network, a borrower may scan for any and/or all available potential lenders and the borrower or the multiplexer can prioritize the potential lenders for data transfer. The formation of the ad hoc network, in embodiments, may use a "borrower/lender" table as shown in FIG. 3. In this example, the borrower or gateway (e.g., multiplexer) can broadcast the table to potential lenders which, in turn, can return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 3, the "Node Name" column may be the unique identifier of a node such as the borrower and lenders. For example, this could be a hostname, a Bluetooth® name or any other information that can uniquely describe the node. The "Node Type" column may describe whether this node is a borrower, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Flow Diagrams

The flow diagrams described herein may be implemented in environments that enable the borrower to select lender's bandwidth based upon optimization criteria. By way of example, the flow diagrams can be implemented in the environment of FIG. 1 to provide instructions for selecting one or more lenders' bandwidth in an ad hoc network and/or may be implemented in the environment of FIG. 2 to provide instructions for selecting one or more lenders' bandwidth in the multiplexed gateway bandwidth sharing architecture. In the various disclosed exemplary embodiments, described below, a bandwidth sharing agreement may be reached on data, quality of service (QoS) and associated costs. This agreement may include compensation instructions for compensating one or more lender of bandwidth in the ad hoc network.

The flow diagrams may represent a high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RNI) and DVD.

Figure 4:
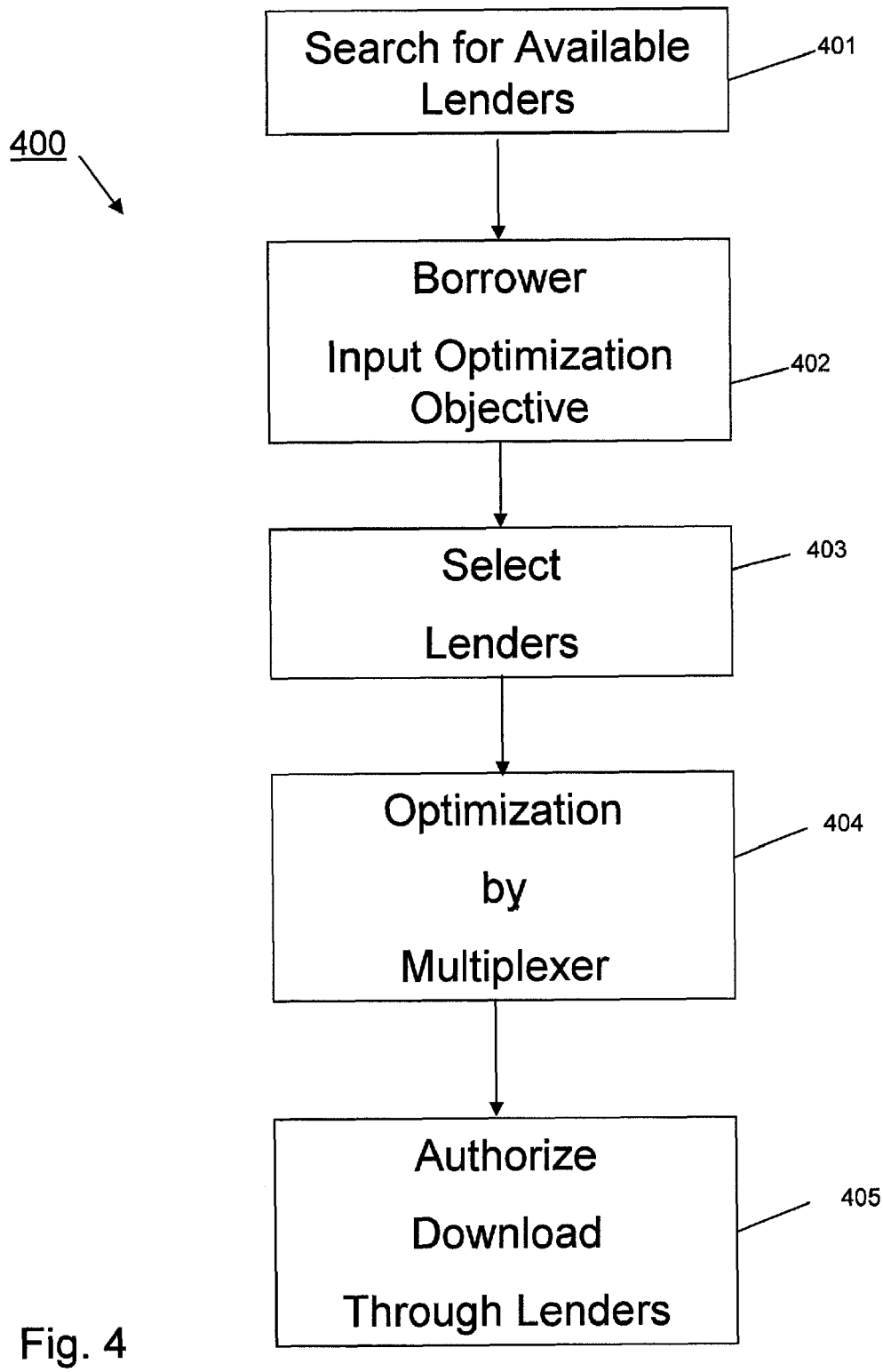
FIG. 4 is a flow diagram for a general overview of an implementation of the invention.

By way of non-limiting example, FIG. 4 illustrates a flow diagram 400 of a process for optimizing the establishment of an ad hoc network in a multiplexed gateway architecture. It is understood that this and all other illustrated examples are provided to facilitate explanation of the invention, but are not to be construed as limiting, such that other flow diagrams and/or processes for optimizing a borrower's selection of lenders in accordance with the features of the invention are within the scope of the instant invention.

The process can be a two-tiered approach in which action occurs at both the borrower and the multiplexer level. As shown, a search for available lenders willing to share bandwidth is performed at step 401. The search or scan for available lenders can be performed by a device utilized for searching or scanning for wireless connection ports, hot spots, etc. The optimization process can then begin at the borrower's level by receiving the borrower's optimization objectives (or techniques) at step 402. The optimization objectives can be, but are certainly not limited to, minimize total cost, minimize total time needed, maximize available bandwidth, minimize the risk of connection drop offs from lenders, maximize lenders' capabilities, etc. At step 402, the wireless ad hoc network has not yet been formed, and the borrower's optimization objectives may be used to the find the right set of lenders for completing the borrower's task, e.g., uploading or downloading file(s). The selection process utilized in step 402 can be similar in general to the borrower's optimization for establishing the ad hoc network for the non-multiplexed peer-to-peer ad hoc environment as described in co-pending application Ser. No. 11/755,802, the disclosure of which is expressly incorporated by reference herein in its entirety.

Once the borrower's optimization objectives are considered, the borrower, at step 403, can select or identify a number of the available lenders whose bandwidth will be borrowed in order to complete the task, e.g., an uploading or downloading of file(s). Moreover, the borrower can select a maximum number of lenders to be considered in the multiplexer's optimization procedures. Once the borrower has selected the desired number of lenders, the second tier of the process can occur. At this point, the ad hoc network may be formed, or may be about to be formed, with a multiplexer.

At step 404, the optimization objectives of the multiplexer, acting as a gateway and providing fast connection to the Internet or the targeted server, are input. The multiplexer's optimization objectives can include, but are not limited to, dividing the file that the borrower would like to download into pieces and allocating the right chunk size to each lender, monitoring the total available aggregated bandwidth of the lenders, monitoring the total bandwidth used by the borrower, keeping track of the time used, maintaining the expected quality of service, communicating with members of the ad hoc network, making recommendations to the members if needed, etc. Based upon the optimization objectives of the borrower and multiplexer, the ad hoc network is established and the task is divided among the lenders for completion. At step 405, authorization is given to complete the task through the selected lenders.

Figure 5:
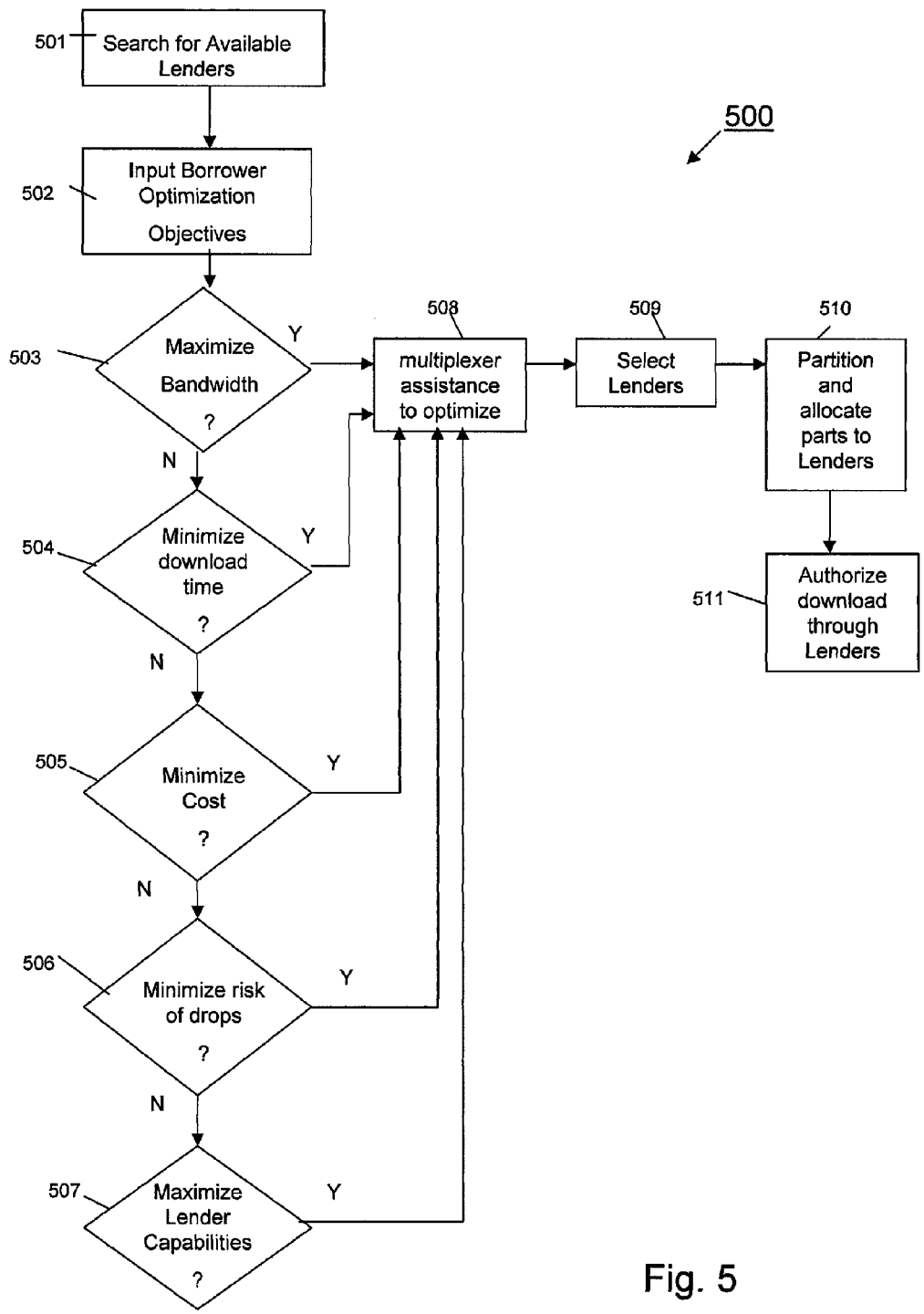
FIG. 5 is a flow diagram for generally implementing the invention.

A further exemplary embodiment of the process according to the invention is shown as flow diagram 500 in FIG. 5. A search for available lenders willing to share bandwidth is performed at step 501, which is essentially the same as the search performed at step 401 of FIG. 4. Once the available lenders are found, the borrower can make choices according to a variety of selection criteria at step 502 that can assist in the selection of the various available lenders. These choices can be predefined preferences, e.g., stored in the user's device or in a remote database of a service provider, or can be input by the borrower in response to a prompt from the service provider, e.g., through a software program stored on either the borrower's device or in a remote database of the service provider. The optimization objectives input by the borrower at step 502 can be, but are not limited to, maximizing available bandwidth at step 503, minimizing total time needed for completing the task at step 504, minimizing total cost for completing the task at step 505, minimizing the risk of connection drop offs from lenders at 506, and/or maximizing lenders' capabilities at step 507.

Once the borrower's optimization objectives are considered at steps 503-507, the borrower can have an option 508 of either selecting a list of available lenders by himself/herself at step 509 or request the multiplexer to assist in the selection at step 510. Once the list of available lenders are identified, based upon the optimization objectives of the borrower and multiplexer, the ad hoc network is established at step 511. The multiplexer can further assist to optimize the situation based on the borrower's optimization criterion at step 512, and the task is divided among the lenders for completion at step 513. Then, at step 514, authorization is given to complete the task through the selected lenders.

Figure 6:
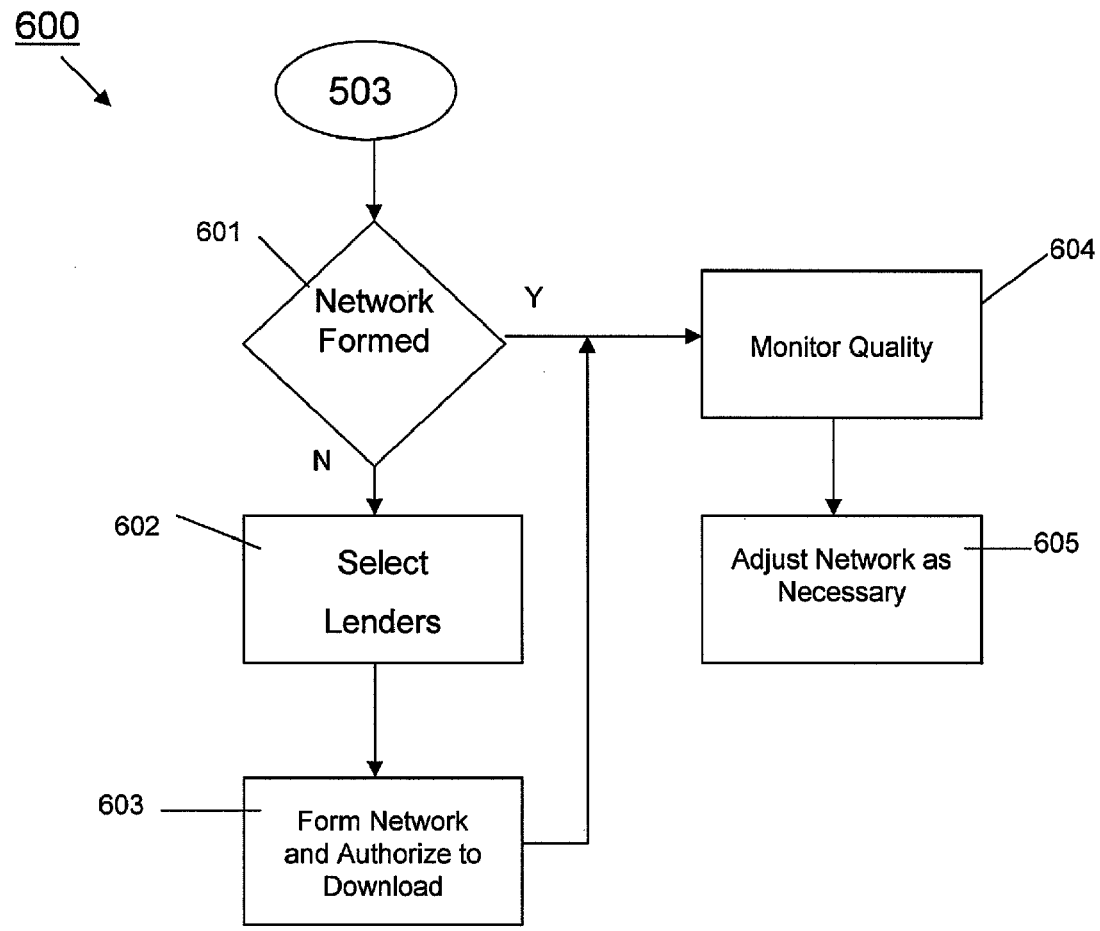
FIG. 6 is a flow diagram for generally implementing optimization for maximum throughput in accordance with aspects of the invention.

An exemplary process 600 in FIG. 6 provides an exemplary process for performing steps 508-514 to select lenders in order to maximize bandwidth. Upon determining the borrower has selected an optimization technique to maximize bandwidth at step 503 (of FIG. 5), a determination is made at step 601 whether the ad hoc network has been formed. When the ad hoc network has not yet been formed, the borrower can select or identify a number of available lenders from those identified through the search for lenders at step 602. Moreover, because all data funnels through the multiplexer, the multiplexer can assist the borrower in the selection at step 602, if desired. To maximize the available bandwidth offered by the lenders in the ad hoc network, the multiplexer can minimize the gap between its bandwidth and the available aggregated bandwidth of the available lenders. This minimization technique can be expressed in equation (1) as follows:

$$\min(\text{bandwidth}MUX - \Sigma \text{ bandwidth}j) \text{ for } j=1\ldots n \quad \text{Equation (1)}$$

Where:
bandwidthMUX is the bandwidth of the multiplexer,
bandwidthj is the bandwidth of lender j, and
n is the number of available lenders.

Thus, in the event the borrower is not certain which of the available lenders to select before the ad hoc network is formed, the multiplexer can help the borrower to determine which lenders to select. For example, the multiplexer can access the list of available lenders from the search and make the borrower's selection of lenders. The multiplexer can make this selection by running some numerical analysis to come up with an optimized list of lenders, or it can run some heuristics such as Markov Decision Process to help sequentially select available lenders based on optimized result of each selection stage. As the Markov Decision Process is known to those ordinarily skilled in the art, no further discussion of this process is necessary.

In step 603, the ad hoc network can be formed with the selected lenders, and completion of the task through the selected lenders can be authorized.

After step 603, or when the ad hoc network is already formed at step 601, the multiplexer can maximize bandwidth by monitoring the aggregated bandwidth at step 604. Through this monitoring of bandwidth, the multiplexer can maximize bandwidth by, e.g., disqualifying lenders from joining the ad hoc network if they fail to achieve a certain percentage of their expected bandwidth, disqualifying lenders from joining the ad hoc network if their connection drop-offs are greater than a defined number of times, and/or finding new resources to provision the service if the total aggregated bandwidth from the lenders is lower than a certain percentage. As a result of this monitoring, the network can be adjusted, as necessary, at step 605 to maximize bandwidth.

When the lenders fail to achieve the certain percentage of expected bandwidth or have greater than a defined number of drop-offs, the multiplexer can request the disqualified lenders to leave the network, and record the percentage of completeness of the task that was assigned to the disqualified lenders. The uncompleted portion or percentage of the task assigned to the disqualified lenders can be awarded to one of the selected lenders, e.g., a high performance lender with fast bandwidth, or a new lender can be selected and assigned this uncompleted portion or percentage of the task.

When the total aggregated bandwidth from the lenders is lower than a certain percentage, the multiplexer can invite either new lenders or another multiplexer as additional resources to join the ad hoc network. In this instance, the multiplexer can assess the ratio of bandwidth that the current pool of available lenders are producing in relation to the bandwidth of the multiplexer, e.g., x %. The multiplexer can then invite new lenders or another multiplexer to join the network, and instruct each lender to download only x % of the originally assigned task. The remaining 100-x % tasks of the current pool of lenders can be assigned to the new list of lenders or multiplexer.

When the borrower is concerned with minimizing the time for completing the task, the multiplexer can help the borrower minimize time by dividing the file into pieces and allocating the right size to each lender according to each bandwidth. In this manner, most or all lenders may finish their portions of the task at the same time, such that the borrower would not need to spend extra time to wait for certain lenders to finish their tasks.

Figure 7:
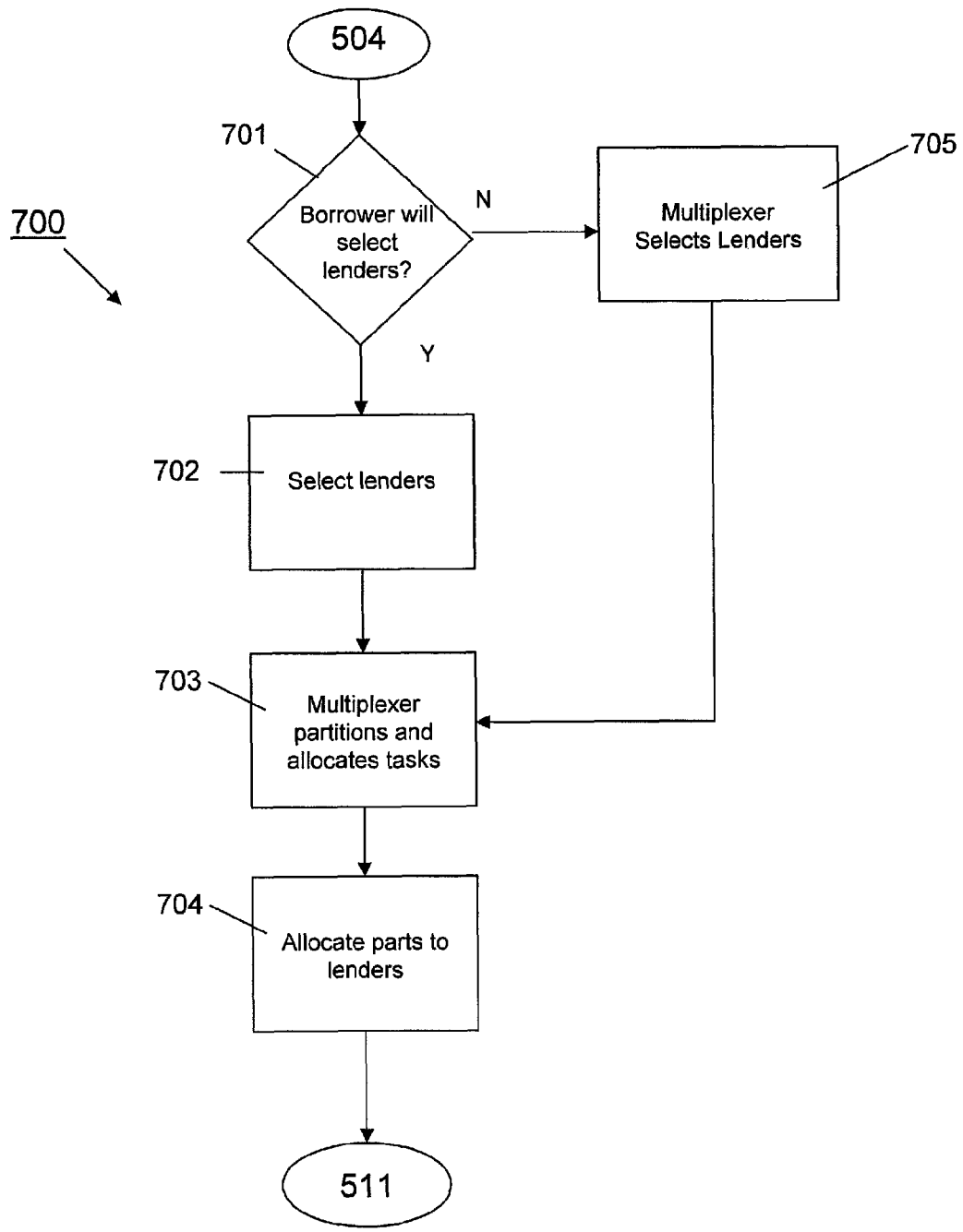
FIG. 7 is a flow diagram for generally implementing optimization for minimum time in accordance with aspects of the invention.

An exemplary process 700 in FIG. 7 provides an exemplary process for performing steps 508-514 to select lenders in order to minimize time for completing the task. Upon determining the borrower has selected an optimization technique to minimize completion time at step 504 (of FIG. 5), a determination is made at step 701 whether the borrower will select the lenders his own. Assuming the borrower is selecting its own lenders, the borrower at step 702 selects "m" lenders from the available lenders found through the search for lenders. In this regard, "m" is less than or equal to the total number of available lenders found.

Once the lenders have been selected or identified by the borrower, the multiplexer can be given the job of allocating the right file size to each selected lender. To assist in this regard, the portion for each lender can be determined from Equations 2 and 3:

$$T = f1/\text{bandwidth}1 = f2/\text{bandwidth}2 = \ldots fm/\text{bandwidth}m \quad \text{(Equation 2)}$$

$$F = f1 + f2 + \ldots + fm \quad \text{(Equation 3)}$$

Where:

T is the time for completing the download;

fj is the size of the file or piece of large file F assigned to selected lender j, for j=1 ... m; and F is the size of the large file that the borrower would like to download.

By solving Equation 2 and Equation 3, the multiplexer can determine the appropriate file size (i.e., f1, f2, ..., fm) for each selected lender so that all selected lenders finish the tasks at the same time. After assigning the file or piece of a file to each lender at step 704, authorization to complete the task may be given at step 511 (of FIG. 5).

When the borrower does not wish to select lenders, e.g., the borrower authorizes the multiplexer to make the lender selection at step 701. For example, the borrower can predefine a maximum number of lenders to use, and this number can be stored in the user's device or in a database of the multiplexer and/or service provider. If the borrower has predefined a maximum number of "m" lenders, the multiplexer may select the optimum "m" lenders from the list of available lenders at step 705 to complete the task in a time conscience manner. Then the multiplexer would divide the task into "m" pieces in step 703 and allocate or assign the pieces to each selected lender at step 704.

With the given number of maximum lenders to be used, which according to this example is "m," then the multiplexer can choose the "m" lenders with the highest bandwidth, under the assumption it takes a shorter amount of time for these lenders to finish their allocated part of task than the other available lenders. The selection of these "m" lenders should be easy since each lender's bandwidth is known. Then, the Equations 2 and 3 utilized above would be used in steps 703 and 704.

The multiplexer can then solve Equation 2 and Equation 3 to determine the right file size for each lender in order to have all the lenders finish their tasks at the same time.

Figure 8:
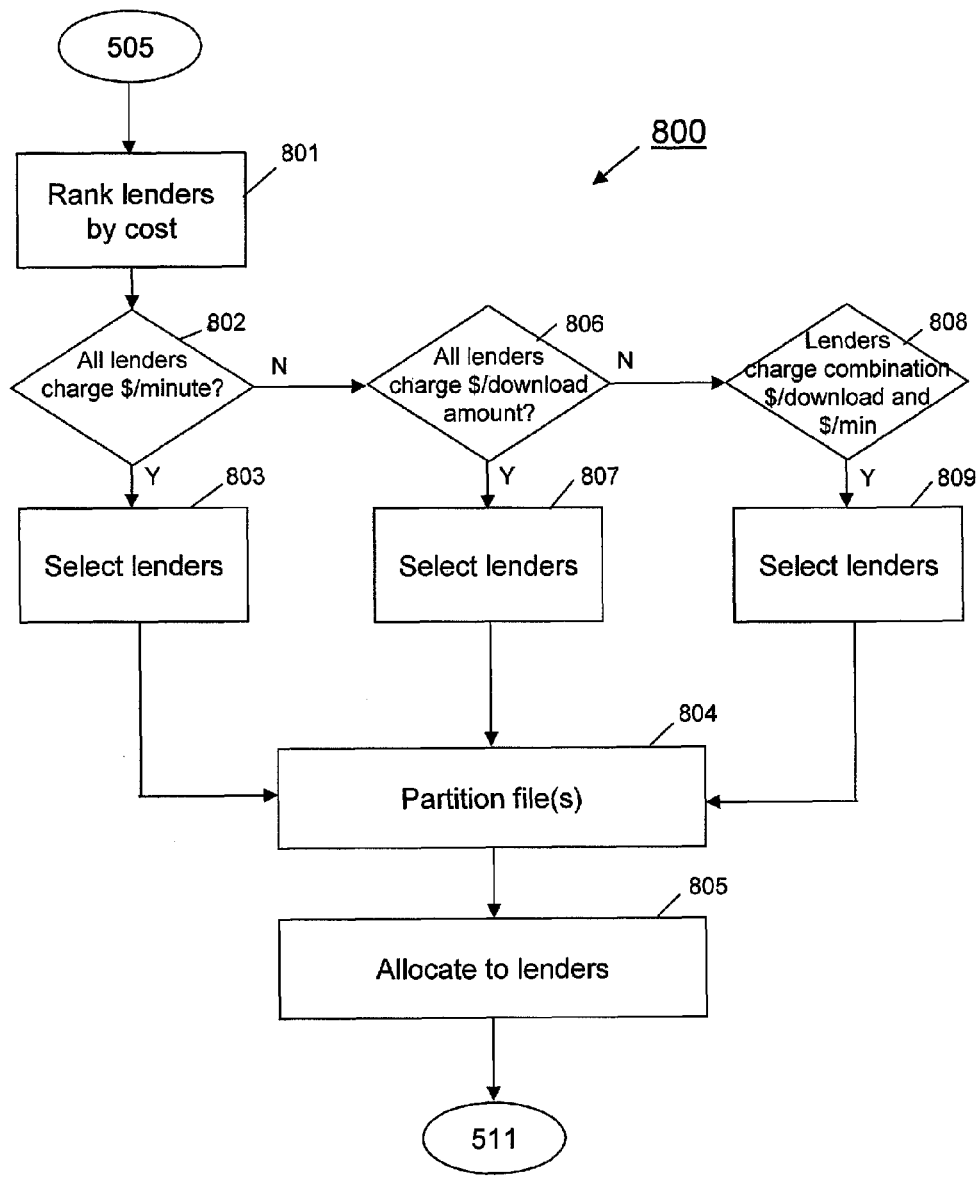
FIG. 8 is a flow diagram for generally implementing optimization for minimum cost in accordance with aspects of the invention.

When the borrower has selected the optimization technique for minimizing the cost for completing the task at step 505 (of FIG. 5), an exemplary process 800 as illustrated in FIG. 8 provides an exemplary process to perform steps 508-514 for selecting lenders in order to minimize cost. The multiplexer can assist the borrower in determining which of the available lenders to select in order to form the ad hoc network. After step 505 (of FIG. 5), the available lenders can be ranked, e.g., from cheapest to most expensive, at step 801. To rank the lenders, the cost for each available lender is calculated.

In determining the lender cost, it should be understood that lenders can charge in different ways, e.g., price per minute, price per Mb downloaded, etc. However, because the cost the borrower pays for each lender is calculated in relation to the lender's bandwidth, size of the file to be uploaded/downloaded, and time used, lenders with the cheapest price per minute or cheapest price per Mb downloaded are not necessarily the cheapest lenders. To rank the lenders, the cost for each lender is calculated as if each lender is the only lender used to complete the task. For lenders charging for bandwidth usage per minute, the following Equation 4a may be utilized:

$$\text{Cost}j = \text{Price}j * ((F/\text{Bandwidth}j)/60), j = 1 \ldots n \quad \text{(Equation 4a)}$$

Where:

F is the size of the task, i.e., large file(s);

Pricej is price of Lender j's bandwidth (in Mbps) usage per minute; and n is the number of available lenders.

For lenders charging per certain Mb of download, the following Equation 4b may be utilized:

$$\text{Cost}j = \text{Price}j * (F/x), j = 1 \ldots n \quad \text{(Equation 4b)}$$

Where:

F is the size of the task, i.e., large file(s);

Pricej is Lender j's price of bandwidth usage per x Mb of download; and n is the number of available lenders.

Once each lender's cost is calculated, the lenders can be ranked or arranged according to their calculated costs of performing the entire task alone at step 801. By way of example, the lenders can be arranged from least or lowest cost to highest cost.

The borrower can predefine a maximum number of the available lenders for selection, e.g., "m" selected lenders, and this maximum number can be stored in the borrower's device or in a remote database of the service provider or multiplexer. When the "m" cheapest lenders all charge on a per minute basis at step 802, the lenders are selected at step 803. The borrower can make this selection on its own or the multiplexer can assist the borrower in selecting lenders. In this regard, the multiplexer supplies the borrower with the list of the "m" cheapest lenders, and describes how to divide the task, e.g., a large file, into pieces at step 804 and to assign which piece to which lender at step 805.

The total cost of using these "m" cheapest lenders who all charge per minute can be calculated by or for the multiplexer as:

$$\text{CostTotal} = (\Sigma \text{ price}j) F / [60 (\Sigma \text{ bandwidth}j)] \text{ for } j = 1 \ldots m \quad \text{(Equation 5)}$$

Where:

Lenders 1 to "m" are the selected "m" cheapest lenders from Equation 4a,

F is the size of the task, such as the total file size to be downloaded collectively by all the lenders within the ad hoc network, bandwidthj is the bandwidth of lender j in Mbps, and pricej is the price that lender j charges per minute.

As a result, the borrower's objective to minimize cost can be represented as:

Min CostTotal

Since the file size F is a fixed number, the optimization can be simplified according to the following Equation 6:

$$\text{Min}(\Sigma \text{ price}j)/(\Sigma \text{ bandwidth}j) \text{ for } j = 1 \ldots m \quad \text{(Equation 6)}$$

At this point, the multiplexer can help the borrower select an optimal number of lenders "m*" to be used, i.e., a value "m*" can be lower or larger than the borrower's predefined maximum number of lenders "m" can be selected, and m* is smaller than the total number of available lenders, n. In this regard, the selected lenders' aggregated bandwidth, which can be represented as ($\Sigma$ bandwidthj), may be maximized, and their respective prices, which can be represented as ($\Sigma$ pricej), may be minimized. This can be easily achieved by trying out j=1, 2, 3, ... m the borrower's predefined maximum number of lenders, or to all the available lenders to determine the number "m*" that provides the most cost efficient download. That is, as the cost associated with the last one or more lenders of the "m" lenders may cause the overall price for completing the task to rise, i.e., these last few lenders of the "m" lenders, e.g., "p" lenders, charge a price out of line with the other cheaper lenders, the borrower may opt to select only "n" lenders, which can be the "m" lenders minus the "p" lenders. It is further noted that the above-noted calculation to optimize the number of lenders can be utilized for all available lenders, i.e., not limited by the borrower's predefined maximum "m," so that the most cost efficient result can be obtained for the borrower.

Once the value "m*," which is "m−p", or "m+p" and represents the optimal number of lenders to be used, is selected by the borrower, an embodiment of the invention can take this value as an implication that the first "m*" cheapest lenders should be selected or used for completing the task. Further, the borrower can predefine preferences to allow the multiplexer to select the "m*" lenders in accordance with the optimization technique. In this exemplary embodiment, these "m*" cheapest lenders can be calculated by using either Equation 4a or Equation 4b above. As the value "m*" can be found, it becomes an easy process to divide the task, e.g., file F into discrete portions (f1, f2, . . . fm*) at step 804 and assign the appropriate portions to each lender, e.g., in accordance with Equation 2 and Equation 3 above, in step 805. As a result, the multiplexer has selected the lenders, divided the task, and assigned the parts of the task according to the borrower's desired optimization.

When the "m*" cheapest lenders all charge on a per download basis at step 806, the multiplexer can act to divide the task, e.g., large file F, among the "m*" lenders in such a manner that the task will be completed by each lender at the same time. In this regard, because the borrower has predefined the maximum number of lenders "m," the multiplexer can perform with process without any further information provided by the borrower. Thus, the multiplexer can accept the "m" number of lenders predefined by the borrower as the selection of lenders at step 807 and calculate cost for completion of the task. Additionally, or alternatively, it is contemplated the borrower can be prompted to input a number of lenders, e.g., "m*" lenders, at step 807, where "m*" is generally, but not necessarily less than "m." The borrower's selection of "m*" lenders can be assisted by a cost analysis of performing the task with 1 to "m" lenders (or all available lenders, if desired), such that the multiplexer informs the borrower of cost analysis results for the borrower's selection. Moreover, it is understood the borrower can authorize the multiplexer to automatically select the "m*" lenders based upon the cost calculations performed by the multiplexer. The multiplexer can then divide the task into "m*" parts at step 804, and assign one of the "m*" parts to each of the "m*" selected lenders at step 805 so that each lender's task will be completed at roughly the same time.

For ease of explanation of this exemplary embodiment, it will be assumed that the multiplexer proceeds with the borrower's maximum number of lenders "m" selected. The total cost of using these "m" cheapest lenders who all charge per download can be calculated as:

$$\text{Cost}j = \text{price}j(fj/xj) \text{ for } j=1 \ldots m \quad \text{(Equation 7)}$$

Where:
  Lenders j is one of the selected n cheapest lenders calculated by using Equation 4b;
  fj is the portion of the large file F that is assigned to lender j; and
  pricej is the price that lender j charges per data volume that is measured per xj units.

To minimize total cost, the multiplexer can utilize Equation 8 as follows:

$$\text{Min CostTotal} = \text{Min price}j(fj/xj) \text{ for } j=1 \ldots m \quad \text{(Equation 8)}$$

Due to the complexity of this exemplary embodiment, it may be advantageous for the multiplexer to limit the calculations to the number of lenders selected by the borrower, e.g., in order to simplify the optimization algorithm. However, if desired, the multiplexer can perform the optimization algorithm for each available lender found from the search for lenders. As a result, the number of lenders providing the most efficient cost for completion of the task can be found, and may be presented to the borrower for review and consideration. This number may not include all "m" lenders. That is, as the cost associated with the last one or more lenders of the "m" lenders may cause the overall price for completing the task to rise, i.e., these last few lenders of the "m" lenders, e.g., "p" lenders, charge a download price out of line with the other cheaper lenders, the borrower may opt to select only "m*" lenders, which can be the "m" lenders minus the "p" lenders, or "m" lenders plus the "p" lenders if the borrower has not chosen enough lenders Moreover, as the values pricej, fj, and xj can be determined for each lender j through Equation 8, the optimum number of lenders can be determined by the multiplexer using numerical analysis by solving for Min CostTotal. Moreover, once the optimum number of lenders is determined, the multiplexer can select the optimum number of lenders on its own or request selection and/or confirmation by the borrower.

Once the optimum number of lenders "m" (or "m*") is found or selected, the process can divide the task, e.g., file F, into discrete portions (f1, f2, . . . , fm) at step 804 and assign the appropriate portions to each lender, e.g., in accordance with Equation 2 and Equation 3 above, in step 805. As a result, the multiplexer may select the lenders, divide the task, and assign the parts of the task according to the borrower's desired optimization.

When the "m" cheapest lenders charge on a combination of a per minute basis and a per download basis at step 808, the multiplexer can calculate the cost of each lender charging per download using Equation 7, while the cost of each lender charging per minute can be calculated with Equation 9 as follows:

$$\text{Cost}j = \text{price}j \, [fj/(60 * \text{bandwidth}j)] \quad \text{(Equation 9)}$$

Where:
  Lenders j is one of the selected n lenders;
  fj is the portion of the large file F that is assigned to lender j;
  bandwidthj is the bandwidth offered by lender j measured in Mbps; and
  pricej is the price that lender j charges per minute.

The borrower can review the above-calculations to assist in selecting the lenders at step 809. In this case, the borrower can determine whether the predefined maximum number of lenders "m" should be reduced or expand to a number "m*" for calculating cost. Moreover, assuming for this exemplary embodiment that the borrower has opted to select "m*" as the number of lenders, and that this "m*" group of lenders includes "p" lenders charging per download and "q" lenders charging per minute, then an optimized cost can be calculated from Equation 10:

$$\text{Min CostTotal} = \text{Min}\{\Sigma \text{ price}j(fj/xj) + \Sigma \text{ price}k \, [fk/(60 * \text{bandwidth}k)]\} \text{ for } j=1 \ldots p \text{ and } k=1 \ldots q \quad \text{(Equation 10)}$$

$$m^* = p + q \quad \text{(Equation 11)}$$

$$F = \Sigma fj + \Sigma fk \text{ for } j=1 \ldots p \text{ and } k=1 \ldots q \quad \text{(Equation 12)}$$

Where:
Lenders j is one of the selected m* lenders;
fj is the portion of the large file F that is assigned to lender j;
fk is the portion of the large file F that is assigned to lender k;
bandwidthk is the bandwidth offered by lender k measured in Mbps;
pricej is the price that lender j charges per data volume;
pricek is the price that lender k charges per minute;
Σ pricej (fj/xj) is the sum of price charged by lenders who charge bandwidth usage per data volume; and
Σ pricek [fk/(60*bandwidthk)] is the sum of price charged by lenders who charge bandwidth usage per minute.

In a manner similar to the exemplary embodiment in which all selected lenders charge on a per download basis, as the size of the task, e.g., file F is known, the values f1, f2, . . . , fm* can be calculated by solving Equation 2 and Equation 3, so that, when the multiplexer assigns or allocates appropriate portions of the divided file F to the selected lenders, the process will be set up so all selected lenders can compete their tasks at essentially the same time. Then, the multiplexer using numerical analysis can calculate an optimum list of lenders by solving expressions from Equation 8 with the constraints set in Equation 9 and Equation 10:

Min Σ pricej (fj/xj) and
Min Σ pricek [fk/(60*bandwidthk)].

In an exemplary embodiment of this option, the borrower can divide the lenders into groups according to their capabilities. In this manner, certain groups of lenders will be assigned exclusively for certain tasks. For example, the borrower can select the list of lenders who have video streaming capabilities and then assign each of them with a download task. Then, other lenders, who may not have any specialties, can be utilized for web surfing.

In an alternative exemplary embodiment of this option, the borrower can assign a percentage of tasks to a group of lenders having capabilities matching task requirements. For example, a desirable percentage (e.g., 80%) of the movie download tasks can be assigned to be handled by the lenders with video streaming capabilities, and use the rest of the 20% of their bandwidth for other tasks.

While the instant invention for optimizing the selection of lenders by a borrower, it is understood that the illustrated examples provided are for the purpose of explanation and are not to be construed as limiting. Thus, it is understood that borrowers may optimize their selection of lenders according to other criteria without departing from the scope of the invention. Further, it is understood that the process discussed with regard to the illustrated examples is likewise provided for ease of explanation, and should not be construed as limiting. Thus, it is understood borrowers may utilize different procedures in optimizing their selection of lenders according to the criteria of the invention without departing from the scope of the invention.

While the invention has been described in terms of embodiments, those skilled in the art will recognize that the invention can be practiced with modifications and in the spirit and scope of the appended claims. For example, while the embodiments have been described with reference to exemplary illustrations and processes, those skilled in the art will recognize that the invention can be practiced with any number of lenders, files, file portions, ISPs, and/or remote locations. Additionally, it should be recognized that a combination of any of the above options may be implemented, where appropriate.

What is claimed:

1. A method, comprising:
identifying available lenders coupled to a multiplexed gateway within a vicinity of a borrower;
selecting at least one optimization criterion;
selecting a number of the identified available lenders based upon the at least one selected optimization criterion;
dividing at least one file to be one of uploaded and downloaded into parts corresponding to the number of selected lenders; and
assigning a part of the at least one file to each selected lender,
wherein the multiplexed gateway creates an ad hoc network including the selected number of lenders; and
the identifying, the selecting the at least one optimization criterion, the selecting the number, the dividing, and the assigning are performed using at least one computer device including a processor.

2. The method of claim 1, wherein the available lenders have available bandwidth and are couplable to the borrower through the multiplexed gateway.

3. The method of claim 1, wherein the at least one selected optimization criterion is selected by the borrower and comprises at least one of minimizing cost, minimizing time, maximizing throughput, minimizing risk of drop-offs, maximizing reliability, and maximizing lender capabilities.

4. The method of claim 1, wherein the selecting of the number of the available lenders comprises the borrower selecting a maximum number of lenders to be considered according to the at least one selected optimization criterion.

5. The method of claim 4, wherein, based upon information from the multiplexed gateway, the borrower selects a number of lenders that is less than the maximum number of lenders.

6. The method of claim 4, wherein the maximum number of lenders is predefined by the borrower prior to the identifying of available lenders.

7. The method of claim 1, wherein the selecting of the number of the available lenders comprises the borrower, based upon a calculation by the multiplexed gateway from the at least one selected optimization criterion, selecting a number of lenders.

8. The method of claim 1, wherein the selecting of the number of the available lenders comprises the multiplexed gateway selecting a number of lenders according to a calculation based upon the at least one selected optimization criterion.

9. The method of claim 1, further comprising the multiplexed gateway ranking the available lenders in an order based upon a calculated cost.

10. The method of claim 9, wherein when each of the selected number of lenders according to the ranking of available lenders charge for bandwidth per minute, the multiplexed gateway calculates costs for the one of uploading and downloading the at least one file through successive combinations of a cheapest lender alone, and a two cheapest lenders through a combination of selected number of lenders according to the ranking of available lenders.

11. The method of claim 10, wherein one of the borrower and the multiplexed gateway select the combination of lenders achieving a most cost efficient result.

12. The method of claim 9, wherein when each of the selected number of lenders according to the ranking of available lenders charge for bandwidth per download, the multiplexed gateway calculates costs for the one of uploading and downloading the at least one file through successive combinations of a cheapest lender alone, and a first two cheapest lenders through a combination of selected number of lenders according to the ranking of available lenders.

13. The method of claim 12, wherein one of the borrower and the multiplexed gateway selects the combination of lenders achieving a most cost efficient result.

14. The method of claim 9, wherein when some of the selected number of lenders according to the ranking of available lenders charge for bandwidth per minute and some of the selected number of lenders according to the ranking of available lenders charge for bandwidth per download, the multiplexed gateway calculates costs for the one of uploading and downloading the at least one file through successive combinations of a cheapest lender alone, and a first two cheapest lenders through a combination of selected number of lenders according to the ranking of available lenders.

15. The method of claim 14, wherein one of the borrower and the multiplexed gateway selects the combination of lenders achieving a most cost efficient result.

16. The method of claim 9, wherein the multiplexed gateway partitions the at least one file into parts and assigns each part to a selected lender so each lender completes one of an upload and a download of its part at essentially a same time.

17. The method of claim 1, wherein, when the at least one selected optimization criterion maximizes throughput, the ad hoc network is formed after the selecting of the number of lenders.

18. The method of claim 1, wherein, when the at least one selected optimization criterion maximizes throughput and the ad hoc network has been created, the multiplexed gateway monitors quality characteristics of the selected lenders.

19. The method of claim 18, wherein, based upon the monitored quality characteristics, the multiplexed gateway adjusts the network.

20. The method of claim 1, further comprising ranking lenders based upon reliability.

21. The method of claim 1, further comprising ranking lenders based upon fewest occurrences of drop-offs as lender.

22. The method of claim 1, further comprising grouping lenders based upon capabilities.

23. The method of claim 1, further comprising ranking lenders based upon borrower satisfaction.

24. The method of claim 1, further comprising storing information about lenders in a centralized database.

25. The method of claim 24, wherein the stored information about lenders includes cost structure, bandwidth connection speed, lender capabilities, and reliability data.

26. The method of claim 24, further comprising reassembling the parts of the at least one file after the one of an upload and a download.

27. The method of claim 1, wherein the steps of claim 1 are provided by a service provider on a fee and/or subscription basis.

28. The method of claim 1, wherein a service provider at least one of creates, deploys, maintains, supports an infrastructure for implementing the steps of claim 1.

29. The method of claim 1, wherein the steps of claim 1 are performed in a multiplexed gateway bandwidth sharing architecture as part of an ad hoc mobile network.

30. The method of claim 1, further comprising performing one of an upload and a download of the parts through the selected lenders via the multiplexed gateway.

31. The method of claim 1, further comprising:
selecting a list of lenders based upon the at least one selected optimization criterion;
forming the ad hoc network as a multiplexed ad hoc network with the borrower, the selected list of lenders and the multiplexed gateway, wherein in the ad hoc network the parts are communicated between the borrower and the selected lenders via local wireless communication protocol and the parts are communicated between the selected lenders and the multiplexed gateway via cellular communication protocol; and
assembling the part from each selected lender into the at least one file.

32. A system for optimizing selection of bandwidth in a multiplexed gateway bandwidth sharing architecture, comprising:
a computer device including a processor which identifies available bandwidth lenders coupled to a multiplexed gateway within a vicinity of a requester;
a selector unit to select at least one requester optimization criteria;
an input unit to receive input from one of the requester and the multiplexed gateway regarding a selected number of the available bandwidth lenders based upon the selected at least one requester optimization criterion;
a divider structured and arranged to divide a task into a number of discrete pieces that correspond to the number of selected lenders; and
an assignor unit to assign each discrete piece of the task to different selected lenders,
wherein the multiplexed gateway creates an ad hoc network that includes the multiplexed gateway. the selected lenders, and the requester.

33. The system in accordance with claim 32, wherein the selected at least one requester optimization criterion comprises at least one of minimizing cost, minimizing time, maximizing throughput, minimizing risk of drop-offs, maximizing reliability, and maximizing lender capabilities.

34. The system in accordance with claim 32, further comprising a calculating unit to determine a cost for each available bandwidth lender to perform the task.

35. The system in accordance with claim 32, further comprising a listing device to rank available bandwidth lenders in order based upon at least one of a calculated cost for completing the task and bandwidth connection speed.

36. The system in accordance with claim 32, further comprising a centralized database to store lender information comprising at least one of cost structure, bandwidth connection speed, lender capabilities, and reliability data.

37. The system in accordance with claim 36, wherein the cost structure comprises at least one of price per unit time and price per Mb downloaded or uploaded.

38. The system in accordance with claim 32, wherein the multiplexed gateway bandwidth sharing architecture is part of an ad hoc mobile network.

39. The system in accordance with claim 32, further comprising a reassembling unit structured and arranged to reassemble each discrete piece of the task.

40. A system comprising:
a server comprising a computer device having a processor, the server having a database containing data associated with one or more instructions for implementing a multiplexed gateway ad-hoc network; and
at least one of a hardware and software component for optimizing selection of lenders of bandwidth and allocation of one of files and pieces of files to the selected lenders of bandwidth and for establishing the multiplexed gateway ad-hoc network between a borrower and the selected lenders of bandwidth,
wherein the multiplexed gateway creates the ad hoc network which includes the multiplexed gateway, the selected lenders, and the borrower.

41. The system in accordance with claim 40, wherein borrower preferences for optimizing the selection of lender of bandwidth are predefined and input to the at least one of hardware and software component for optimizing.

42. The system in accordance with claim 40, wherein the borrower is prompted to input data for selecting a number of lenders of bandwidth, and the multiplexed gateway allocates the files and pieces of files to the at least one of hardware and software component for optimizing.

43. A method for optimizing selection of bandwidth in a multiplexed gateway bandwidth sharing architecture, comprising:

providing a computer infrastructure comprising at least one computer device including a processor operable to:
receive at least one optimization criterion from a requester of bandwidth;
receive a number corresponding to a number of available lenders of bandwidth to be selected for completing a task;
divide the task into a number discrete pieces; and
assign, via the multiplexed gateway, each piece of the divided task to a different selected lender of bandwidth,
wherein the multiplexed gateway creates an ad hoc network that includes the multiplexed gateway, the selected lenders, and the requester.

44. A computer program product comprising a computer usable storage medium having readable program code embodied in the storage medium and including at least one component to:

identify available bandwidth lenders coupled to a multiplexed gateway within a vicinity of a requester;

receive at least one optimization criterion from the requester;

receive a number of lenders coupled to the multiplexed gateway to be selected;

divide, via the multiplexed gateway, a task into discrete pieces that correspond in number to the number of selected lenders; and assign each discrete piece to a different selected lender, wherein the multiplexed gateway creates an ad hoc network that includes the multiplexed gateway, the selected lenders, and the requester.

45. The computer program product in accordance with claim 44, wherein the received at least one optimization criterion comprises at least one of minimizing cost, minimizing time, maximizing throughput, minimizing risk of drop-offs, maximizing reliability, maximizing lender capabilities.

* * * * *